(12) United States Patent
Choi

(10) Patent No.: US 7,681,848 B2
(45) Date of Patent: Mar. 23, 2010

(54) STAND FOR IMAGE DISPLAY DEVICE

(75) Inventor: Yoon Suk Choi, Daegu-si (KR)

(73) Assignee: LG Electronics Inc., Seoul (KR)

( * ) Notice: Subject to any disclaimer, the term of this patent is extended or adjusted under 35 U.S.C. 154(b) by 499 days.

(21) Appl. No.: 11/399,429

(22) Filed: Apr. 7, 2006

(65) Prior Publication Data

US 2007/0080270 A1   Apr. 12, 2007

(30) Foreign Application Priority Data

Oct. 6, 2005   (KR)  ............... 10-2005-0094039

(51) Int. Cl.
*A47B 9/00* (2006.01)
*F16M 11/04* (2006.01)
(52) U.S. Cl. ............... 248/188.8; 248/166; 248/176.3; 248/917; 361/679.21; 361/679.22
(58) Field of Classification Search ............ 248/188.8, 248/284.1, 274.1, 276.1, 282.1, 166, 439, 248/184, 688, 677, 917, 176.3, 919, 121, 248/127, 150; 361/681, 679.02, 679.21, 361/679.22; 108/115
See application file for complete search history.

(56) References Cited

U.S. PATENT DOCUMENTS

| | | | | |
|---|---|---|---|---|
| 348,706 | A | * 9/1886 | Weiner | ................. 108/115 |
| 4,834,329 | A | * 5/1989 | Delapp | ................. 248/183.3 |
| 4,989,813 | A | * 2/1991 | Kim et al. | ............... 248/184.1 |
| 5,501,420 | A | * 3/1996 | Watt et al. | ............. 248/280.11 |
| 5,768,535 | A | 6/1998 | Chaddha et al. | |
| 6,076,787 | A | * 6/2000 | Troyer | .................. 248/166 |
| 6,493,036 | B1 | 12/2002 | Fernandez | |
| 6,822,857 | B2 | * 11/2004 | Jung et al. | .................. 361/681 |
| 7,283,354 | B2 | * 10/2007 | Choi et al. | .................. 361/681 |
| 7,448,581 | B2 | * 11/2008 | Lim et al. | ................ 248/176.3 |
| 2002/0009149 | A1 | 1/2002 | Rodriguez et al. | |
| 2002/0067433 | A1 | 6/2002 | Yui et al. | |

FOREIGN PATENT DOCUMENTS

| KR | 2005-0021276 | * | 3/2005 |
|---|---|---|---|
| WO | WO-2004/075558 A1 | | 9/2004 |
| WO | WO-2004/077809 A2 | | 9/2004 |

* cited by examiner

*Primary Examiner*—Anita M King
(74) *Attorney, Agent, or Firm*—Birch, Stewart, Kolasch & Birch, LLP

(57) ABSTRACT

A stand for an image display device is provided. In the stand, a supporting member supports the image display device, a connecting member is rotatably coupled to the supporting member, and a base member supports the image display device with respect to a floor. The base member is rotatable in the same direction as the rotation direction of the connecting member for being folded to a back of the image display device. Therefore, a bottom surface of the stand can be folded to the back of the image display device, maximizing the number of image display devices that can be packed into the same containing space.

15 Claims, 11 Drawing Sheets

STAND FOR IMAGE DISPLAY DEVICE

BACKGROUND OF THE INVENTION

1. Field of the Invention

The present invention relates to a stand for an image display device, and more particularly, to a foldable stand for an image display device that can be folded to a back of the image display device from a bottom of the image display device when the image display device is packed, enabling more image display devices to be packed in the same space.

2. Description of the Related Art

Generally, image display devices, such as plasma display panels (PDPs) and Liquid Crystal Displays (LCDs), are provided with a stand for standing on a floor.

Such a stand includes a supporting member fixed to a bottom portion of an image display device, and a base member connected to the supporting member for being placed on a floor. Usually, the base member is fixed with respected to the supporting member.

Meanwhile, the screen size of the image display devices becomes larger, and the thickness of the image display devices becomes smaller in order to satisfy user's demand.

As the image display device becomes larger and thinner, it becomes more important to prevent the image display device from falling forward when the image display device is placed on a floor, for the safety of users.

It is preferable that the stand of the image display device have a wide base member to prevent the image display device from falling forward when the image display device is installed on a floor.

Particularly, the possibility of falling down of the image display device in a front direction can be reduced by increasing the width of the base member of the stand in a front-to-back direction of the image display device.

However, the stand of the related art is fixed to the image display device. Therefore, if the width of the base member of the stand is elongated in the front-to-back direction of the image display device, the packing size of the image display device increases when packing the image display device for transportation.

The increase of the packing size of the image display device lowers the number of packed image display devices that can be contained in the same space, thereby increasing physical distribution cost.

On the contrary, if the front-to-back width of the stand is reduced to increase the number of packed image display devices that can be contained in the same space, the resistance of the image display device against falling becomes weak.

Therefore, the image display device may easily fall forward when the image display device is place on a floor. This threatens the safety of customers and lowers the product stability.

To solve this problem, the image display device and the stand are separated from each other for packing. However, in this case, it is inconvenient for users to mounting the stand on the image display device before installing the image display device on a floor.

As described above, increasing the front-to-back width of the base member results in physical distribution cost increase because less image display devices are contained in the same space, and decreasing the front-to-back width of the base member results in the safety problem.

Therefore, there is a need for an improved stand for the image display device that can increase the number of image display devices that can be packed and contained in the same space without lowering the safety of users.

SUMMARY OF THE INVENTION

Accordingly, the present invention is directed to a stand for an image display device that substantially obviates one or more problems due to limitations and disadvantages of the related art.

An object of the present invention is to provide a stand for an image display device, in which a base member can be folded to a back of the image display device when packing the image display device, so that more image display devices can be packed in the same space.

Another object of the present invention is to provide a stand for an image display device, in which a base member has an elongated front-to-back width for the safety of users when the stand is placed on a floor.

A further another object of the present invention is to provide a stand for an image display device that is easily folded when packed and unfolded when installed, for the convenience of users.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a stand for an image display device, the stand including: a supporting member supporting the image display device; a connecting member rotatably coupled to the supporting member; and a base member supporting the image display device with respect to a floor, the base member being rotatable in the same direction as the rotation direction of the connecting member for being folded to a back of the image display device.

According to the present invention, the bottom of the stand can be folded to the back of the image display device for packing the image display device, minimizing the packing size of the image display devices.

Further, the stand has an elongated front-to-back width, so that the image display device can be stably supported on a floor.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
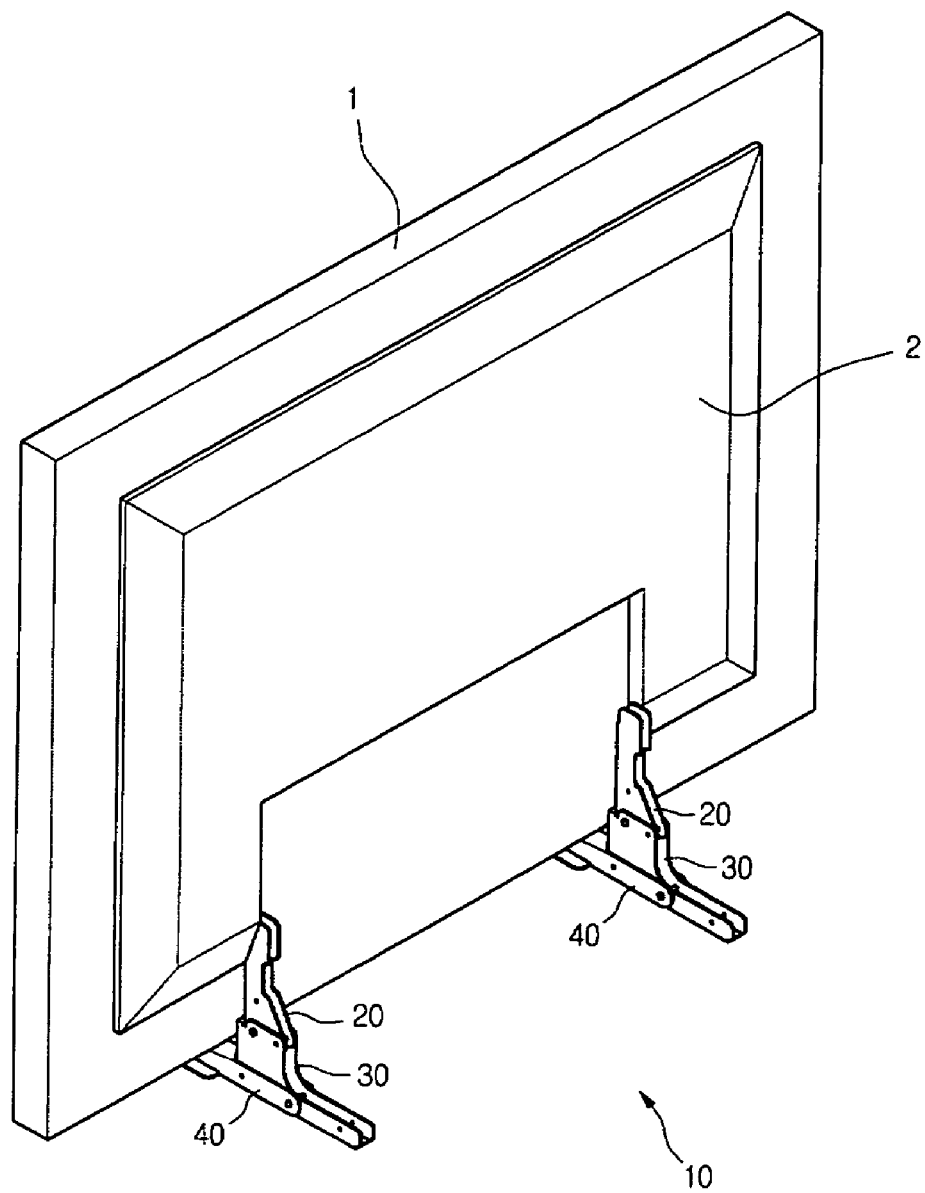
FIG. 1 is a perspective view showing a stand installed on an image display device according to a first embodiment of the present invention.

FIG. 1 is a perspective view showing a stand installed on an image display device according to a first embodiment of the present invention.

Referring to FIG. 1, a stand 10 of the present invention includes a pair of identically-structured leg units that are individually fixed to a lower portion of an image display device 1.

In detail, the stand 10 includes a supporting member 20 fixed to a lower portion of a back cover 2 of the image display device 1, a connecting member 30 rotatably connected to a lower portion of the supporting member 20, and a base member 40 rotatably connected to the connecting member 30 for standing on a floor.

The connecting member 30 is designed to rotate toward a back of the image display device 1 with respect to the supporting member 20. Further, the base member 40 is designed to be rotated in the same direction of the rotating direction of the connecting member 30. That is, the base member 40 can be rotated toward the back of the image display device 1.

As mentioned above, in the stand for the image display device 1, the base member 40 and the connecting member 30 connected to supporting member 20 supporting the image display device can be rotated to the back of the image display device 1, such that the stand 10 can be folded to the back of the image display device 1.

In this structure of the stand of the present invention, the base member 40 of the stand 10 is placed on a floor for standing the image display device 1 with respect to the floor, and the base member 40 is folded to the back of the image display device 1 for packing the image display device 1.

Therefore, when the image display device 1 is packed, the front-to-back width of the stand 10 does not affect the packing size of the image display device 1, so that more image display devices can be packed into the same space.

The structure of the stand 10 of the present invention will now be more fully described with reference to other drawings.

Figure 2:
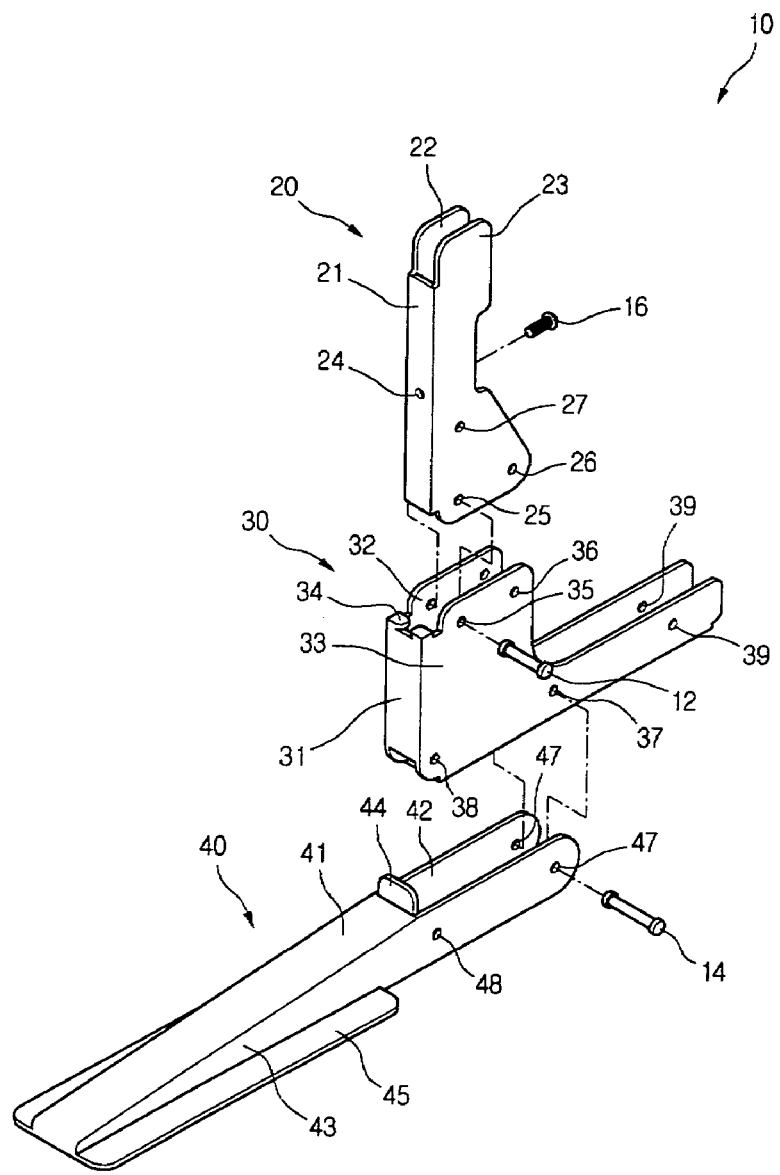
FIG. 2 an exploded perspective view of the stand for the image display device according to the first embodiment of the present invention.
Figure 3:
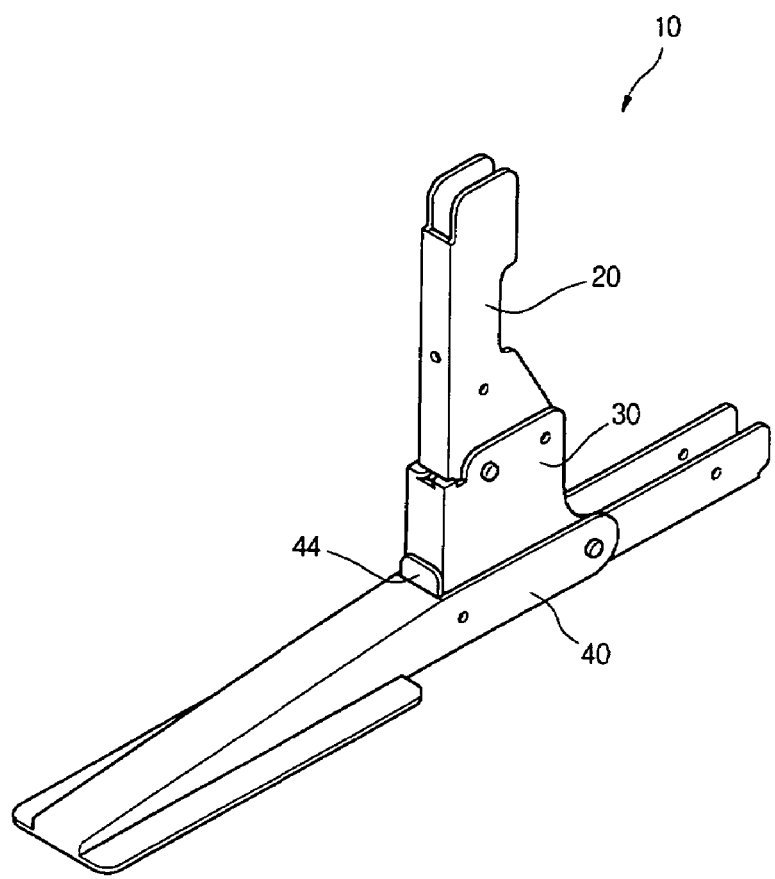
FIG. 3 is an assembled perspective view of the stand for the image display device according to the first embodiment of the present invention.

FIG. 2 an exploded perspective view of the stand 10 for the image display device 1 according to the first embodiment of the present invention, and FIG. 3 is an assembled perspective view of the stand 10 depicted in FIG. 2.

Referring to FIGS. 2 and 3, the stand 10 of the present invention includes the supporting member 20, the connecting member 30, and the base member 40.

In detail, the supporting member 20 includes a forward-facing front portion 21 abutted on the back cover 2 of the image display device 1, and two side portions 22 and 23 extending from both sides of the front portion in a backward direction.

Here, the front portion 21 and the two side portions 22 and 23 are plate-shaped with a "⊏"-shaped section.

In detail, the front portion 21 has a vertically elongated rectangular plate shape with a back surface fixing hole 24 at a center thereof.

Referring to FIG. 2, the back surface fixing hole 24 receives a fastening member 16 such as a screw therethrough. The fastening member 16 is fixed to a lower portion of the back cover 2 of the image display device 1 for fixing the supporting member 20 to the image display device 1.

When viewed in FIG. 2, the side portions 22 and 23 includes a left side portion 22 extending a left side edge of the front portion 21, and a right side portion 23 extending from a right side edge of the front portion 21.

Preferably, the left and right side portions 22 and 23 are corresponding and parallel with each other.

The left and right side portions 22 and 23 are perpendicular to the front portion 21. Therefore, the supporting member 20 can stably support the image displaying device 1 in a vertically standing position though the supporting member 20 is formed of a thin plate material.

Meanwhile, the left and right side portions 22 and 23 include first hinge holes 25 though lower portions to receive a first hinge shaft 12.

Preferable, the first hinge holes 25 are adjacent to the front portion 21.

Meanwhile, the connecting member 30 is disposed under the supporting member 20.

The connecting member 30 includes a front portion 31 having a rectangular plate shape and facing in a front direction when the stand is erected, and two parallel side portions 32 and 33 extending from both sides of the front portion 31 in a backward direction.

The front portion 31 of the connecting member 30 is placed substantially in parallel with the front portion 21 of the supporting member 20 when the stand 10 is erected.

The connecting member 30 includes a pair of supporting protrusions 34 on a top of the front portion 31. The supporting protrusions 34 are bent inwardly from both sides of the top of the front portion 31 in a perpendicular direction to the front portion 31.

The supporting protrusions 34 are a supporting structure for supporting the supporting member 20 from the bottom when the stand 10 is standing on a floor.

Top surfaces of the supporting protrusions 34 makes contact with a bottom end of the front portion 21 of the supporting member 20 when the stand 10 is standing on a floor, such that the supporting member 20 can be supported by the supporting protrusions 34.

Meanwhile, the two side portions 32 and 33 of the connecting member 30, as shown in FIG. 2, extend from both side edges of the front portion 31 in a backward direction. The two side portions 32 and 33 are generally L-shaped.

In detail, when viewed in FIG. 2, the side portions 32 and 33 include a left side portion 32 extending from a left side edge of the front portion 31, and a right side portion 33 extending from a right side edge of the front portion 31.

Since the left and right side portions 32 and 33 are perpendicular to the front portion 31, the connecting member 30, which is formed of a thin plate material, can stably support the image display device 1.

The left and right side portions 32 and 33 define first hinge holes 35 through upper portions thereof. When assembled, the first hinge holes 35 of the connecting member 30 are aligned with the first hinge holes 25 defined in the lower portion of the supporting member 20, and the hinge shaft 12 is inserted into the first hinge holes 25 and 35 that are aligned, such that the connecting member 30 can be rotatably coupled to the supporting member 20.

Here, the first hinge holes 35 of the connecting member 30 are disposed outside the first hinge holes 25 of the supporting member 20.

Meanwhile, it is preferable that there be a predetermined frictional force between the supporting member 20 and the connecting member 30.

The frictional force may be caused by the first hinge 12.

Further, the frictional force may be caused from a contact surface between the supporting member 20 and the connecting member 30.

Owing to the predetermined frictional force between the supporting member 20 and the connecting member 30, the supporting member 20 can safely support the image display device 1 when the stand is placed on a floor, and the connecting member 30 can maintain its position after it is rotated with respect to the supporting member 20.

Meanwhile, the supporting member 20 and the connecting member 30 include a first matching portion, such that standing and folded positions of the supporting member 20 and the connecting member 30 can be checked.

When the stand 10 is in a standing position, it can be checked through the first matching portion whether the supporting member 20 and the connecting member 30 are exactly parallel with each other. Further, when he stand is in a folded position, it can be checked through the first matching portion whether the supporting member 20 and the connecting member 30 are perpendicular to each other.

In detail, the first matching portion includes horizontal matching holes 26 and vertical matching holes 27 that are defined in the supporting member 20, and first matching holes 36 defined in the connecting member 30.

The horizontal matching holes 26 and the first hinge holes 25 are horizontally aligned at a predetermined distance from each other.

The vertical matching holes 27 and the first hinge holes 25 are vertically aligned. The vertical matching holes 27 and the first hinge holes 25 are spaced the same distance as the horizontal matching hole 26 and the first hinge holes 25.

Meanwhile, the first matching holes 36 of the connecting member 30 are horizontally aligned with the first hinge holes 35 of the connecting member 30.

The first matching holes 36 and the first hinge holes 35 are spaced the same distance as the horizontal matching holes 26 and the first hinge holes 25 of the supporting member 20.

When the supporting member 20 and the connecting member 30 are coupled by the first hinge shaft 12 and the stand 10 is in its standing position, the horizontal matching holes 26 of the supporting member 20 are aligned with the first matching holes 36 of the connecting member 30.

By checking the alignment between the horizontal matching holes 26 and the first matching holes 36, it can be determined that the stand 10 is correctly positioned in its standing position.

Here, a fastening member such as a rod can be inserted through the first matching holes 36 and the horizontal matching holes 26 that are aligned in the standing position of the stand 10, in order to lock the supporting member 20 and the connecting member 30 in the standing position.

Meanwhile, when the connecting member 30 is rotated 90 degrees with respect to the supporting member 20, the first matching holes 36 are aligned with the vertical matching holes 27.

Therefore, when the stand 10 is folded, it can be determined whether the connecting member 30 is folded perpendicular to the supporting member 20 or not by checking the alignment between the first matching holes 36 and the vertical matching holes 27.

Further, when the connecting member 30 is folded, a fastening member such as a rod can be inserted through the first matching holes 36 and the vertical matching holes 27 that are aligned, in order to lock the supporting member 20 and the connecting member 30 in the folded position.

Meanwhile, the first matching portion can be constructed in a shape different from the hole shape.

For example, inwardly protruded circular bosses can be formed on the connecting member 30 instead of the first matching holes 36.

In this case, when the stand 10 is placed on a floor in its standing position, the bosses may be inserted into the horizontal matching holes 26, such that the stand can be kept in the standing position.

Further, when the connecting member 30 is rotated 90 degrees with respect to the supporting member 20, the bosses, as a stopping structure, may be inserted into the vertical matching holes 27 to lock the connecting member 30.

Meanwhile, it is preferable that the left side portion 32 and the right side portion 33 of the connecting member 30 be formed of an L-shaped plate material with lower ends longer than upper ends.

When the connecting member 30 is placed on a floor, the lower end of the connecting member 30 makes contact with the floor.

Therefore, since the connecting member 30 is L-shaped and the lower end of the connecting member 30 extends backward with respect to a floor, the lower end of the connecting member 30 functions as a support structure to prevent the image display device 1 from falling backward.

The left side portion 32 and the right side portion 33 define second hinge holes 37 in lower center portions as a hinge center of the connecting member 30 and the base member 40. The second hinge holes 37 receive a second hinge shaft 14.

Meanwhile, the base member 40 of the stand 10, which is to be placed on a floor, extends forward from the front of the image display device 1. The base member 40 includes a top portion 41 approximately parallel with a floor when the base member 40 is placed on the floor and a pair of vertical side portions 42 and 43 running the length of the base member 40 under the top portion 41.

The top portion 41 has a rectangular plate shape and sloped down in a forward direction of the image display device 1.

Since the top portion 41 of the base member 40 extends in a forward direction of the image display device 1, the contact surface between the base member 40 and a floor can be increased.

Therefore, the base member 40 can support the image display device 1 more stably, thereby preventing the image display device 1 from falling forward.

Here, as the top portion 41 becomes longer in the forward direction of the image display device 1, the possibility of overturning the image display device 1 reduces.

Meanwhile, a rotation preventing portion 44 extends upward from a rear edge of the top portion 41 in a vertical direction.

The rotation preventing portion 44 makes contact with a lower side of the front portion 31 of the connecting member 30 when the stand 10 is in its standing position.

When the base member 40 is placed on a floor, the rotation preventing portion 44 prevents the base member 40 from rotating clockwise (when viewed in FIG. 2) with respect to the connecting member 30, so that the stand 10 can stably support the image display device 1.

Meanwhile, when viewed in FIG. 2, the side portions 42 and 43 of the top portion 41 include a left side portion 42 and a right side portion 43. The left side portion 42 extends downwardly in a vertical direction from a left edge of the top portion 41 and further extends in a backward direction. The right side portion 43 extends downward in a vertical direction from a right edge of the top portion 41 and further extends in a backward direction.

Preferably, the left and right side portions 42 and 43 are integrated with the top portion 41.

The left and right side portions 42 and 43 define second hinge holes 47 in rear end portions thereof.

When assembled, the second hinge holes 47 of the base member 40 are aligned with the second hinge holes 37 of the connecting member 30, and the second hinge shaft 14 is inserted through the aligned hinge holes 47 and 39, such that the base member 40 can be rotatably connected to the connecting member 30.

When the base member 40 is connected to the connecting member 30 in this way and the stand 10 is standing, rear inside surfaces of the right and left side portions 43 and 42 make contact with a lower front side of the connecting member 30.

Meanwhile, the right and left side portions 43 and 42 include floor supports 45 having predetermined areas and extending outward from lower ends of the right and left side portions 43 and 42.

The floor supports 45 increase the contact surface between the base member 40 and a floor, such that the base member 40 can be stably placed on the floor. The structure and shape of the floor supports 45 can be variously changed.

Meanwhile, it is preferable that the base member 40 be rotatable up to 180 degrees with respect to the connecting member 30 about the second hinge shaft 14.

Here, it is preferable that there be a predetermined frictional force between the connecting member 30 and base member 40.

The predetermined frictional force may be generated from the second hinge shaft 14 or the contact surface between the connecting member 30 and base member 40.

Owing to the predetermined frictional force, the connecting member 30 and the base member 40 can safely support the image display device 1 when the stand is placed on a floor, and the base member 40 can maintain its position after it is rotated.

The connecting member 30 and the base member 40 include a second matching portion for checking the standing position and folded positions of the connecting member 30 and the base member 40.

The second matching portion includes second matching holes 38 and third matching holes 39 that are defined in the connecting member 30 and base matching holes 48 defined in the base member 40.

The second matching holes 38 and the third matching holes 39 are defined on both sides of the second hinge holes 37 in correspondence with each other and horizontally spaced a predetermined distance from the second hinge holes 37.

Meanwhile, the base matching hole 48 of the base member 40 are horizontally positioned with respect to the second hinge holes 47 of the base member 40.

The distance between the base matching holes 48 and the second hinge holes 47 is equal to the distance between the second matching holes 38 and the second hinge holes 37 of the connecting member 30.

Here, when the connecting member 30 is connected with the base member 40 by the second hinge shaft 14 and the stand is placed on a floor, the second matching hole 38 of the connecting member 30 is aligned with the base matching holes 48 of the base member 40.

Accordingly, when the stand 10 is standing, it can be determined whether the stand is correctly standing or not by checking the alignment between the second matching holes 38 of the connecting member 30 and the base matching holes 48 of the base member 40.

Here, when the stand is standing, a coupling member such as a rod can be inserted into the base matching holes 48 and the second matching holes 38 that are aligned, in order to prevent relative rotation between the connecting member 30 and the base member 40.

Meanwhile, when the base member 40 is rotated 180 degrees with respect to the connecting member 30, the base matching holes 48 come into alignment with the third matching holes 39.

Therefore, when the stand 10 is folded, it can be determined whether the connecting member 30 is folded in parallel with the supporting member 20 by checking the alignment between the first matching holes 36 and the vertical matching holes 27.

Further, when the connecting member 30 is folded, a fastening member such as a rod can be inserted into the base matching holes 48 and the third matching holes 39 that are aligned with each other, in order to prevent relative rotation between the connecting member 30 and the base member 40.

Meanwhile, the second matching portion can be constructed in a shape different from the hole shape. For example, inwardly protruded circular bosses can be formed on the connecting member 30 instead of the base matching holes 48.

In this case, when the stand 10 is standing on a floor, the bosses may be fitted into the second matching holes 38, such that the stand 10 can be kept in the standing position.

Further, when the base member 40 is rotated 180 degrees with respect to the connecting member 30, the bosses, as a stopping structure, may be fitted into the third matching holes 39 to lock the base member 40.

An operation of the stand 10 for the image display device will now be described.

FIGS. 3 to 6 sequentially show the positions of the stand from a standing position to a folded position according to present invention.

In detail, FIG. 3 is a perspective view showing the stand 10 when it is in a standing position according to the sent invention.

Figure 4:
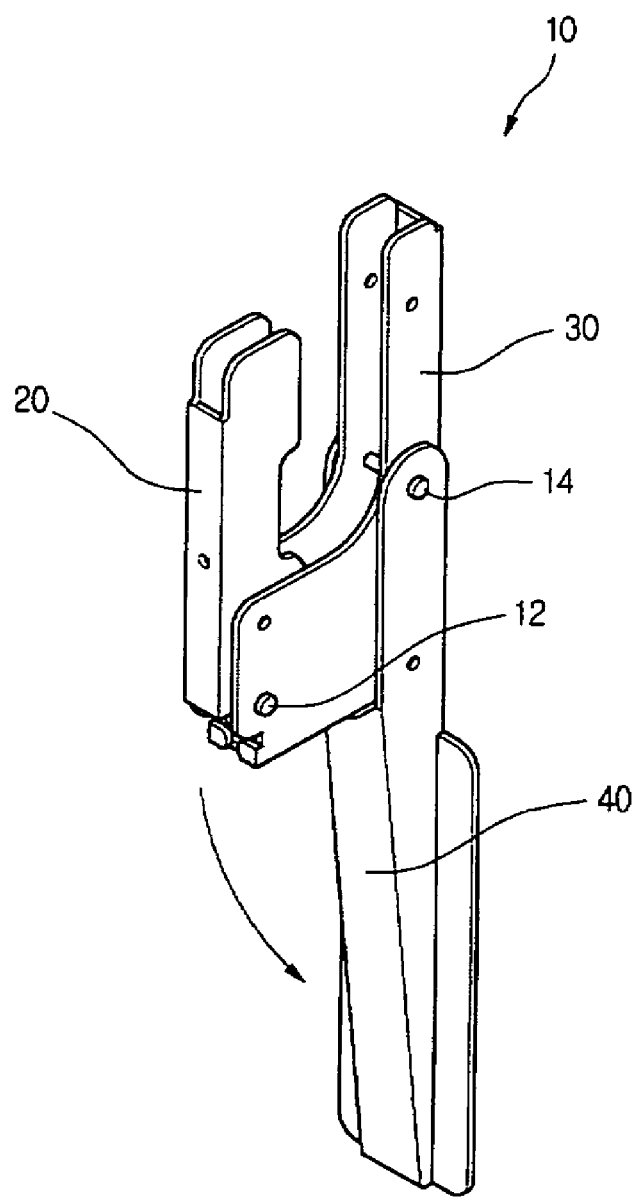
FIGS. 4 to 6 are perspective views showing a folding motion of the stand for the image display device according to the first embodiment of the present invention.

FIG. 4 shows the stand 10 when the connecting member is rotated 90 degrees with respective to the supporting member according to the present invention.

Figure 5:
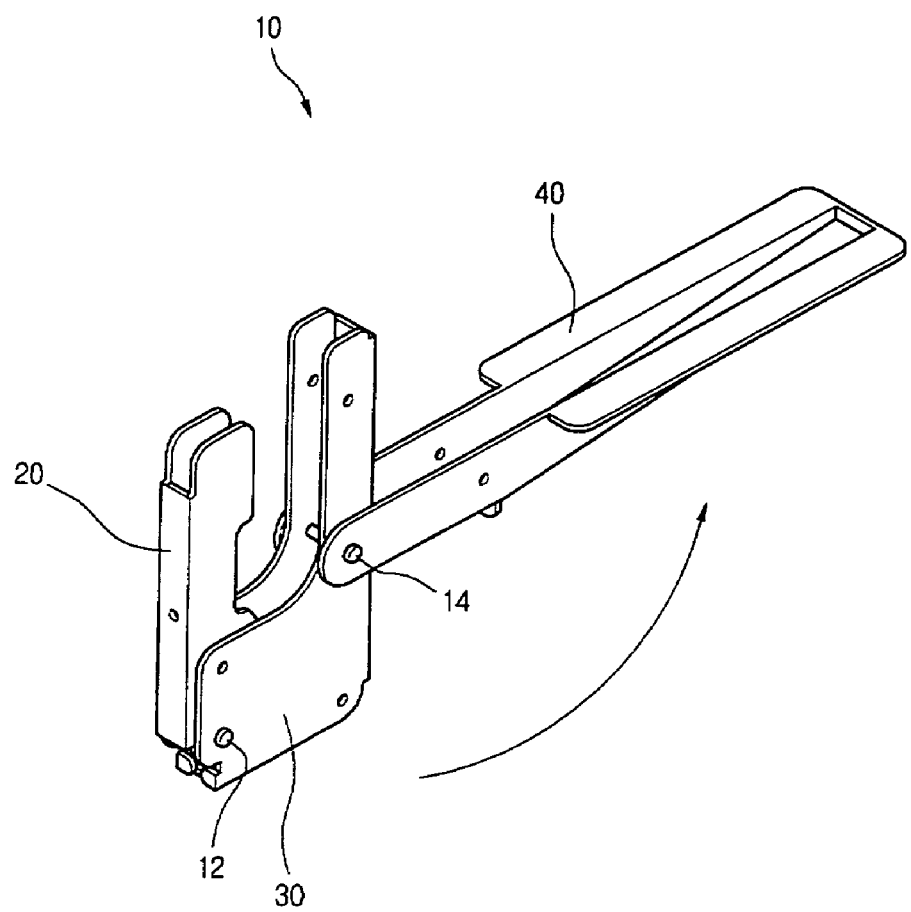

FIG. 5 shows the stand 10 when the base member 40 is rotated 90 degrees with respect to the connecting member 30 according to the present invention.

Figure 6:
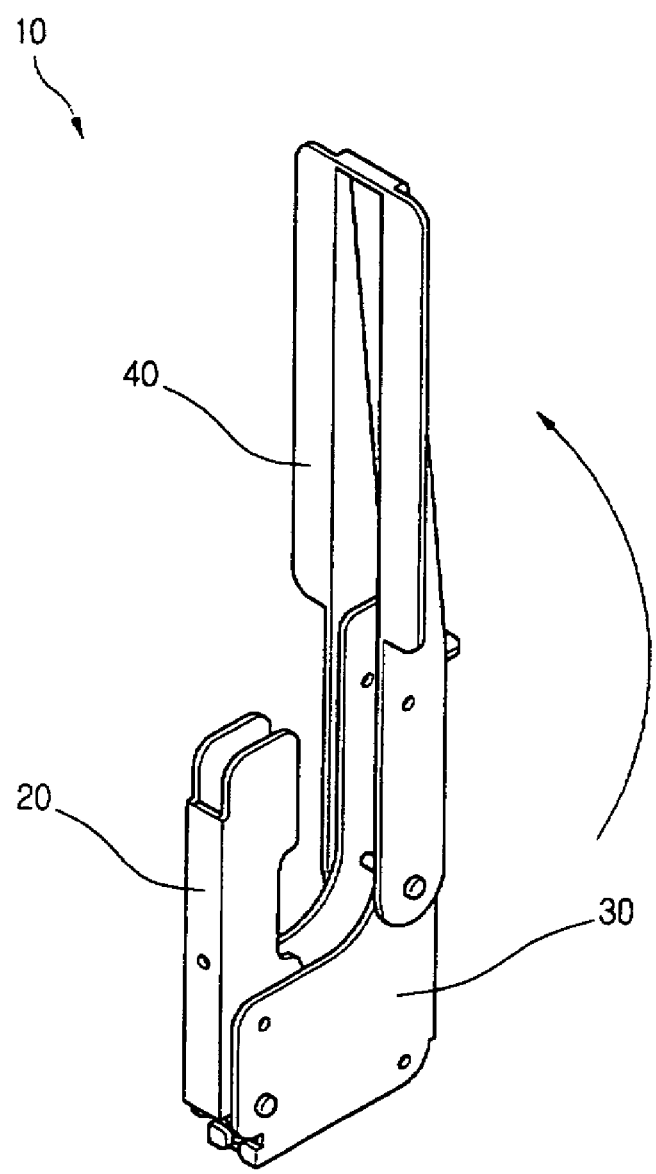

FIG. 6 shows the folded position of the stand 10 when base member 40 is rotated 180 degrees with respect to the connecting member 30.

Figure 7:
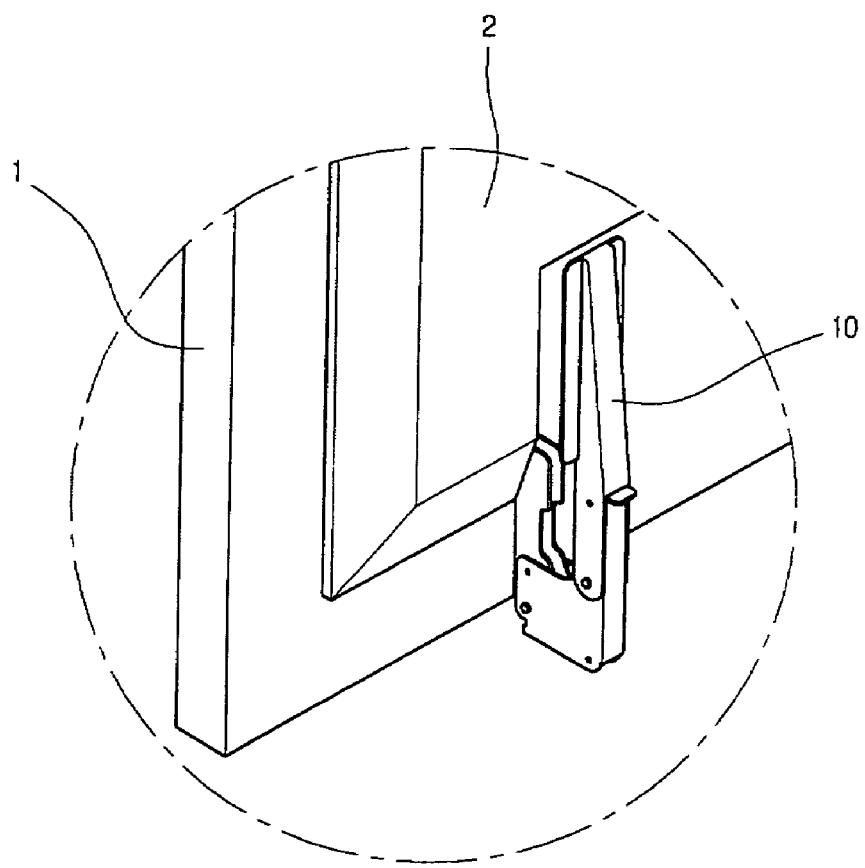
FIG. 7 is a partial perspective view showing the stand folded on a back of the image display device according to the first embodiment of the present invention.

FIG. 7 shows the stand 10 installed on a back of the image display device 1 in the folded position as shown in FIG. 6.

For packing the image display device 1 placed on a floor, the base member 40 of the stand 10 installed on the lower portion of the image display device 1 is folded to the back of image display device 1.

Folding procedures of the stand 10 will now be described with reference to FIGS. 3 to 6.

When the stand 10 of the present invention is placed on a floor, the front portion 21 of the supporting member 20 and the front portion 31 of the connecting member 30 are aligned in parallel with each other, and the rotation preventing portion 44 is in contact with the lower portion of the connecting member 30.

When a user or operator intends to fold the stand 10, the user can lay down the image display device 1 and rotate the base member 40 of the stand 10 downward.

When the base member 40 is rotated, both the connecting member 30 and the base member 40 are rotated about the first hinge shaft 12 as shown in FIG. 4.

For this, it is preferable that the frictional force of the first hinge shaft 12 is smaller than that of the second hinge shaft 14.

When the connecting member 30 is rotated 90 degrees with respect to the supporting member 20, a rear surface of the front portion 31 of the connecting member 30 comes into contact with the lower side of the supporting member 20, and thus, the connecting member 30 is not rotated any more.

In this way, the rotation of the connecting member 30 is stopped.

In this state, the base member 40 is further rotated in the same direction as the rotation of the connecting member 30 as shown in FIG. 5.

The base member 40 is rotated until the base member 40 is rotated 180 degrees with respect to the connecting member 30. When the base member 40 is rotated 180 degrees with respect to the connecting member 30, a rear surface of the front portion 41 of the base member 40 comes into contact with the lower end of the connecting member 30.

When the rear surface of the front portion 41 of the base member 40 comes into contact with the lower end of the connecting member 30 by the 180 degree rotation of the base member 40, the base member 40 stops rotating. That is, the stand 10 is fully folded. This fully folded state of the stand 10 is shown in FIG. 6. FIG. 7 shows the stand 10 installed on the back of the image display device 1 in its fully folded state.

In this way, the bottoms of the base member 40 and the connecting member 30 located at the lower portion of the stand 10 for standing on a floor can be moved to the back of the image display device 1 by the foldable structure of the stand 10.

When it is intended to transport the image display device 1, the stand 10 can be folded in this way, so that the packing size of the image display device 1 can be reduced, and thus, more image display devices can be packed into the same containing space.

Further, when it is intended to installed the folded stand on a floor, the stand 10 can be easily unfolded by rotating the base member 40 clockwise (when view in FIG. 6).

Therefore, the image display device 1 can be stably placed on a floor by unfolding the pair of leg units of the stand 10 and placing the leg units on the floor.

In the stand 10, the bottom surface of the base member 40 prevents the image display device 1 from falling forward, and the bottom surface of the connecting member 30 prevents the image display device 1 from falling backward. Therefore, the image display device 1 can be stably supported with respect to the floor.

Further, the length of the forwardly extending bottom surface of the base member 40 and the length of the backwardly extending bottom surface of the connecting member 30 can be elongated much more for the safety of users.

In the stand of the present invention, the base member and the connecting member are folded to the back of the image display device about the hinge shafts, such that the extending lengths of the base member and the connecting member with respect to the floor do not affect the folding motions of the base member and the connecting member.

Figure 8:
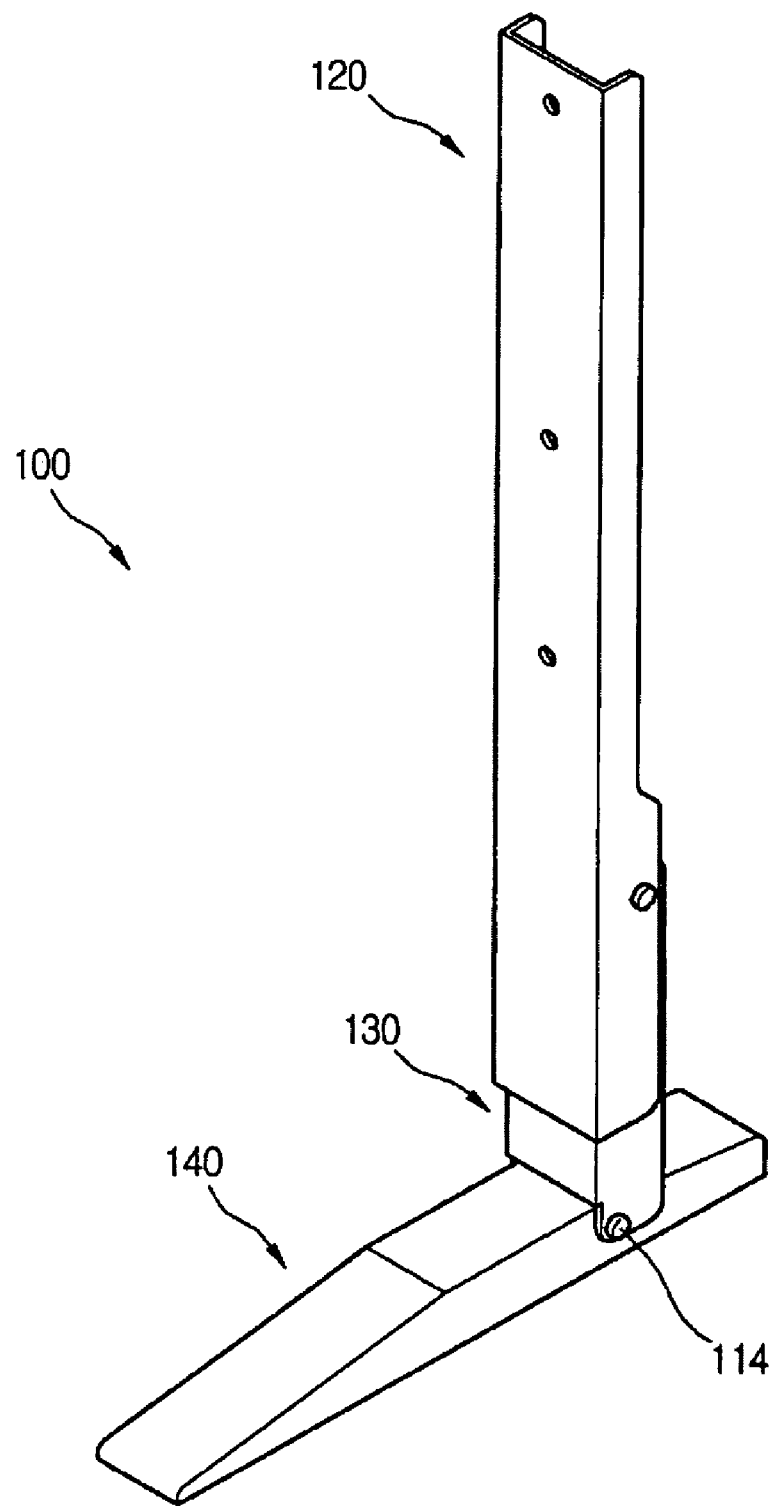
FIG. 8 is a perspective view showing a stand for an image display device according to a second embodiment of the present invention.

FIG. 8 shows a stand according to a second embodiment of the present invention.

In this embodiment shown in FIG. 8, the stand has a connecting member and a base member that have simple structures when compared with the first embodiment.

Descriptions for the same parts as the first embodiment will be omitted for conciseness. Different parts from the first embodiment will now be described in comparison with the first embodiment.

A stand 100 of the second embodiment includes a supporting member 120, a connecting member 130, and a base member 140. The connecting member 130 has a ⊏-shaped cross section. The connecting member 130 includes a front portion, a right portion, and a left portion. The right and left portions are formed on both sides of the front portion and have the same width from the top to the bottom.

The connecting member 130 is rotatably connected to the supporting member 120 by a first hinge shaft inserted into a first hinge holes defined in a lower portion of the supporting member 120.

A second hinge shaft 114 is inserted in a lower portion of the connecting member 130. The base member 140 is rotatably connected to the connecting member 130 by the second hinge shaft 114.

The base member 140 includes a bottom forming the bottom of the stand 100. The bottom of the base member 140 extends in forward and backward directions of an image display device to support the image display device when the image display device is installed on a floor.

Although, in the first embodiment, the bottom of the connecting member extends in the backward direction of the image display device to form a supporting surface for the image display device with respect to a floor, in the second embodiment, the bottom of the base member 140 extends in the backward direction as well as in the forward direction of the image display device.

Figure 9:
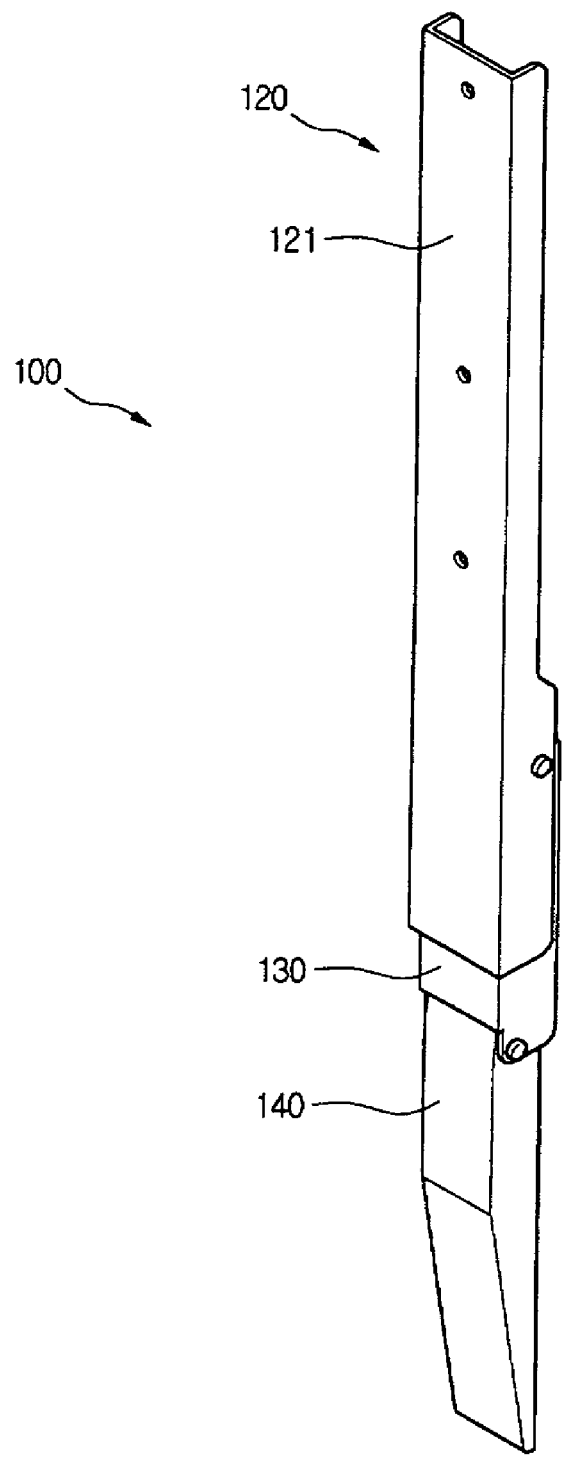
FIGS. 9 to 11 are perspective views showing a folding motion of the stand for the image display device according to the second embodiment of the present invention.
Figure 10:
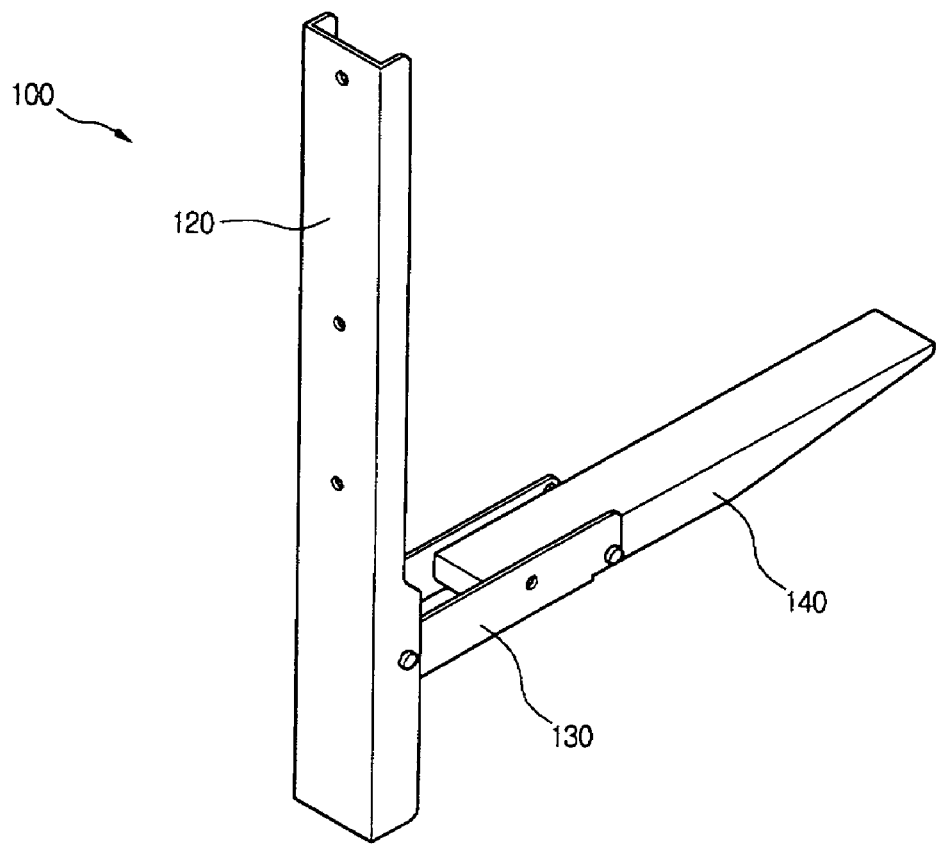
Figure 11:
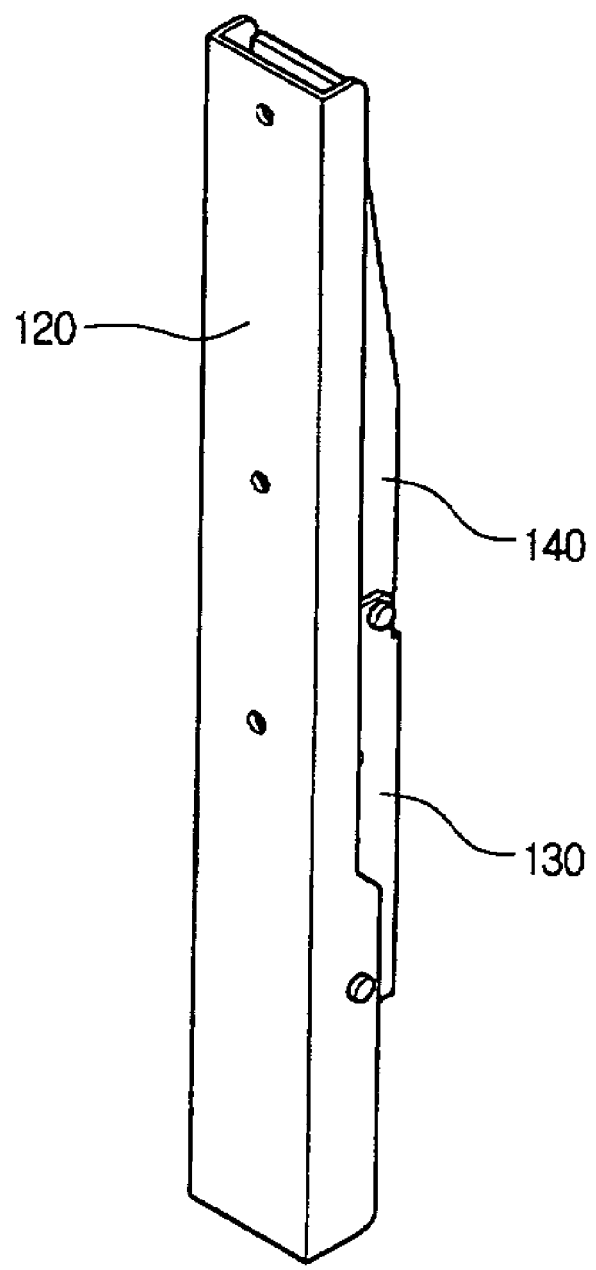

Folding procedures of the stand 100 are shown in FIGS. 9 to 11.

When compared with the first embodiment, in the folding procedures of the stand 100 of the second embodiment, the base member 140 is rotated 90 degrees with respect to the connecting member 130, and then, the connecting member 130 is rotated 180 degrees with respect to the supporting member 120. Other folding procedures are the same as the first embodiment.

FIG. 11 shows the folded state of the stand 100.

The stand 100 of the second embodiment can be installed on a back of the image display device, and it can be folded to the back of the image display device as shown in FIG. 11.

As described above, when the image display device is packed, the stand is folded to the back of the image display device, and thus, the stand takes much less space than the image display device. Therefore, more image display devices can be packing into the same containing space without detaching the stand.

Meanwhile, when the image display device is installed on a floor, the stand can be easily unfolded and placed on the floor by simply rotating the base member of the stand in a reverse direction. Therefore, users can install the image display device conveniently.

It will be apparent to those skilled in the art that various modifications and variations can be made in the present invention. Thus, it is intended that the present invention covers the modifications and variations of this invention provided they come within the scope of the appended claims and their equivalents.

As described above, according to the stand for the image display device of the present invention, the bottom surface of the stand can be folded to the back of the image display device when the image display device is packed, thereby maximizing the number of packed image display devices that can be contained in the same space.

Further, the image display device can be stably supported when it is placed on a floor owing to the elongated width of the stand in the front-to-back direction of the image display device screen.

What is claimed is:

1. A stand for an image display device, the stand comprising:
   a supporting member configured to fix to the image display device;
   a connecting member coupled to the supporting member and rotatable in forward and backward directions with respect to the supporting member; and
   a base member configured to support the image display device with respect to a floor, the base member being rotatable in the same direction as the rotation direction of the connecting member for being folded to a back of the image display device,
   wherein a lower surface of the base member is configured to face to a back of the image display device when the image display device is packed, and
   wherein the base member is rotatable 180 degrees with respect to the connecting member.

2. The stand according to claim 1, wherein the stand is provided in pair on a bottom portion of the image display device.

3. The stand according to claim 1, wherein the connecting member comprises a backwardly extending portion on a bottom portion for making contact with the floor.

4. The stand according to claim 1, wherein the base member comprises a forwardly extending portion placed on the floor to prevent the image display device from falling forward.

5. The stand according to claim 1, wherein the connecting member comprises a supporting structure on a top and configured to support a side of the supporting member.

6. The stand according to claim 1, wherein the supporting member and the connecting member comprise a matching portion and configured to check standing and rotating states of the supporting member and the connecting member.

7. The stand according to claim 1, wherein the connecting member and the base member comprise a matching portion configured to check standing and rotating states of the connecting member and the base member.

8. The stand according to claim 1, wherein the connecting member is rotatable 90 degrees with respect to the supporting member.

9. The stand according to claim 1, wherein a rotational friction force between the supporting member and the connecting member is smaller than a rotational friction force between the connecting member and the base member.

10. The stand according to claim 1, wherein the base member comprises a hinge shaft formed on an end.

11. A stand for an image display device, the stand comprising a pair of leg units supporting the display device, each of the leg units comprising:
    a supporting member configured to fix to a bottom portion of the image display device;
    a connecting member coupled to the supporting member and rotatable in forward and backward directions of the supporting member; and
    a base member coupled to an end of the connecting member and configured to support the image display device with respect to a floor, the base member being rotatable in the same direction as the rotation direction of the connection member,
    wherein a lower surface of the base member is configured to face to a back of the image display device when the image display device is packed, and
    wherein the base member comprises an elongated bottom portion extending in forward and backward directions of the image display device for preventing the image display device from falling down when the image display device is placed on the floor.

12. The stand according to claim 11, wherein the supporting member is formed of a plate material with a ⊏-shaped cross-section.

13. The stand according to claim 11, wherein the connecting member is formed of a plate material with a ⊏-shaped cross-section.

14. The stand according to claim 11, wherein the connecting member and the base member comprise hinge shafts, respectively, the hinge shafts being parallel with each other.

15. The stand according to claim 11, wherein the base member comprises a hinge shaft formed on a top center portion parallel to the floor.

* * * * *